United States Patent
Vyas et al.

(10) Patent No.: US 12,041,495 B2
(45) Date of Patent: Jul. 16, 2024

(54) TECHNIQUES FOR CELL SELECTION AND SERVICE CONTINUITY FOR CONDITIONAL HANDOVER

(71) Applicant: QUALCOMM Incorporated, San Diego, CA (US)

(72) Inventors: Uttam Vyas, Hyderabad (IN); Muralidharan Murugan, Hyderabad (IN); Bapineedu Chowdary Gummadi, Hyderabad (IN); Rishika Tindola, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/447,897

(22) Filed: Sep. 16, 2021

(65) Prior Publication Data

US 2023/0084271 A1    Mar. 16, 2023

(51) Int. Cl.
*H04W 36/00*    (2009.01)
*H04W 36/30*    (2009.01)

(52) U.S. Cl.
CPC .......... *H04W 36/00835* (2018.08); *H04W 36/00837* (2018.08); *H04W 36/305* (2018.08)

(58) Field of Classification Search
CPC ..... H04W 36/00835; H04W 36/00837; H04W 36/305
See application file for complete search history.

(56) References Cited

U.S. PATENT DOCUMENTS

| | | | | |
|---|---|---|---|---|
| 6,546,251 | B1* | 4/2003 | Dalsgaard | H04W 36/26 455/437 |
| 2014/0036868 | A1* | 2/2014 | Guo | H04W 36/165 370/331 |
| 2016/0353340 | A1* | 12/2016 | Yang | H04W 36/0058 |
| 2017/0064691 | A1* | 3/2017 | Kubota | H04W 36/22 |
| 2019/0069226 | A1* | 2/2019 | Lee | H04W 48/18 |
| 2019/0159219 | A1* | 5/2019 | Hosseini | H04W 72/56 |
| 2020/0084683 | A1* | 3/2020 | Moosavi | H04W 36/24 |
| 2021/0266801 | A1* | 8/2021 | Shah | H04W 76/16 |

(Continued)

FOREIGN PATENT DOCUMENTS

| | | |
|---|---|---|
| EP | 3836623 A1 | 6/2021 |
| WO | 2020149650 A1 | 7/2020 |
| WO | 2020229552 A1 | 11/2020 |

OTHER PUBLICATIONS

International Search Report and Written Opinion—PCT/US2022/075203—ISA/EPO—dated Nov. 29, 2022.

*Primary Examiner* — Barry W Taylor
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive configuration information identifying a set of cells configured for conditional handover (CHO). The UE may identify one or more features associated with a cell. The UE may monitor one or more cells of the set of cells, wherein the one or more cells are associated with the one or more features, and wherein the one or more cells are prioritized over cells not associated with the one or more features in the cell search. The UE may initiate a handover to an identified cell based at least in part on the cell search. Numerous other aspects are described.

30 Claims, 7 Drawing Sheets

(56) References Cited

U.S. PATENT DOCUMENTS

| | | | |
|---|---|---|---|
| 2021/0306824 A1* | 9/2021 | Li | H04W 4/40 |
| 2021/0345300 A1* | 11/2021 | Selvanesan | H04L 5/001 |
| 2021/0368568 A1* | 11/2021 | Jangid | H04L 1/203 |
| 2021/0376985 A1* | 12/2021 | Zhou | H04L 5/0053 |
| 2021/0377830 A1* | 12/2021 | Jin | H04W 4/40 |
| 2021/0377832 A1* | 12/2021 | Wang | H04W 36/0033 |
| 2022/0014987 A1* | 1/2022 | Fujishiro | H04W 36/08 |
| 2022/0030453 A1* | 1/2022 | Kumar | H04W 36/06 |
| 2022/0053403 A1* | 2/2022 | You | H04W 36/32 |
| 2022/0070740 A1* | 3/2022 | Futaki | H04W 36/36 |
| 2022/0417954 A1* | 12/2022 | Hong | H04W 72/569 |
| 2023/0262557 A1* | 8/2023 | Zhu | H04W 36/087 |
| | | | 455/436 |

* cited by examiner

TECHNIQUES FOR CELL SELECTION AND SERVICE CONTINUITY FOR CONDITIONAL HANDOVER

FIELD OF THE DISCLOSURE

Aspects of the present disclosure generally relate to wireless communication and to techniques and apparatuses for cell selection and service continuity for conditional handover.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information identifying a set of cells configured for conditional handover (CHO). The method may include identifying one or more features associated with a cell. The method may include monitoring one or more cells of the set of cells, wherein the one or more cells are associated with the one or more features, and wherein the one or more cells are prioritized over cells not associated with the one or more features. The method may include initiating a handover to an identified cell based at least in part on the monitoring.

Some aspects described herein relate to a UE for wireless communication. The user equipment may include a memory and one or more processors coupled to the memory. The one or more processors may be configured to receive configuration information identifying a set of cells configured for CHO. The one or more processors may be configured to identify one or more features associated with a cell. The one or more processors may be configured to monitor one or more cells of the set of cells, wherein the one or more cells are associated with the one or more features, and wherein the one or more cells are prioritized over cells not associated with the one or more features. The one or more processors may be configured to initiate a handover to an identified cell based at least in part on the monitoring.

Some aspects described herein relate to a non-transitory computer-readable medium that stores a set of instructions for wireless communication by a UE. The set of instructions, when executed by one or more processors of the UE, may cause the UE to receive configuration information identifying a set of cells configured for CHO. The set of instructions, when executed by one or more processors of the UE, may cause the UE to identify one or more features associated with a cell. The set of instructions, when executed by one or more processors of the UE, may cause the UE to monitor one or more cells of the set of cells, wherein the one or more cells are associated with the one or more features, and wherein the one or more cells are prioritized over cells not associated with the one or more features. The set of instructions, when executed by one or more processors of the UE, may cause the UE to initiate a handover to an identified cell based at least in part on the monitoring.

Some aspects described herein relate to an apparatus for wireless communication. The apparatus may include means for receiving configuration information identifying a set of cells configured for CHO. The apparatus may include means for identifying one or more features associated with a cell. The apparatus may include means for monitoring one or more cells of the set of cells, wherein the one or more cells are associated with the one or more features, and wherein the one or more cells are prioritized over cells not associated with the one or more features. The apparatus may include means for initiating a handover to an identified cell based at least in part on the monitoring.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
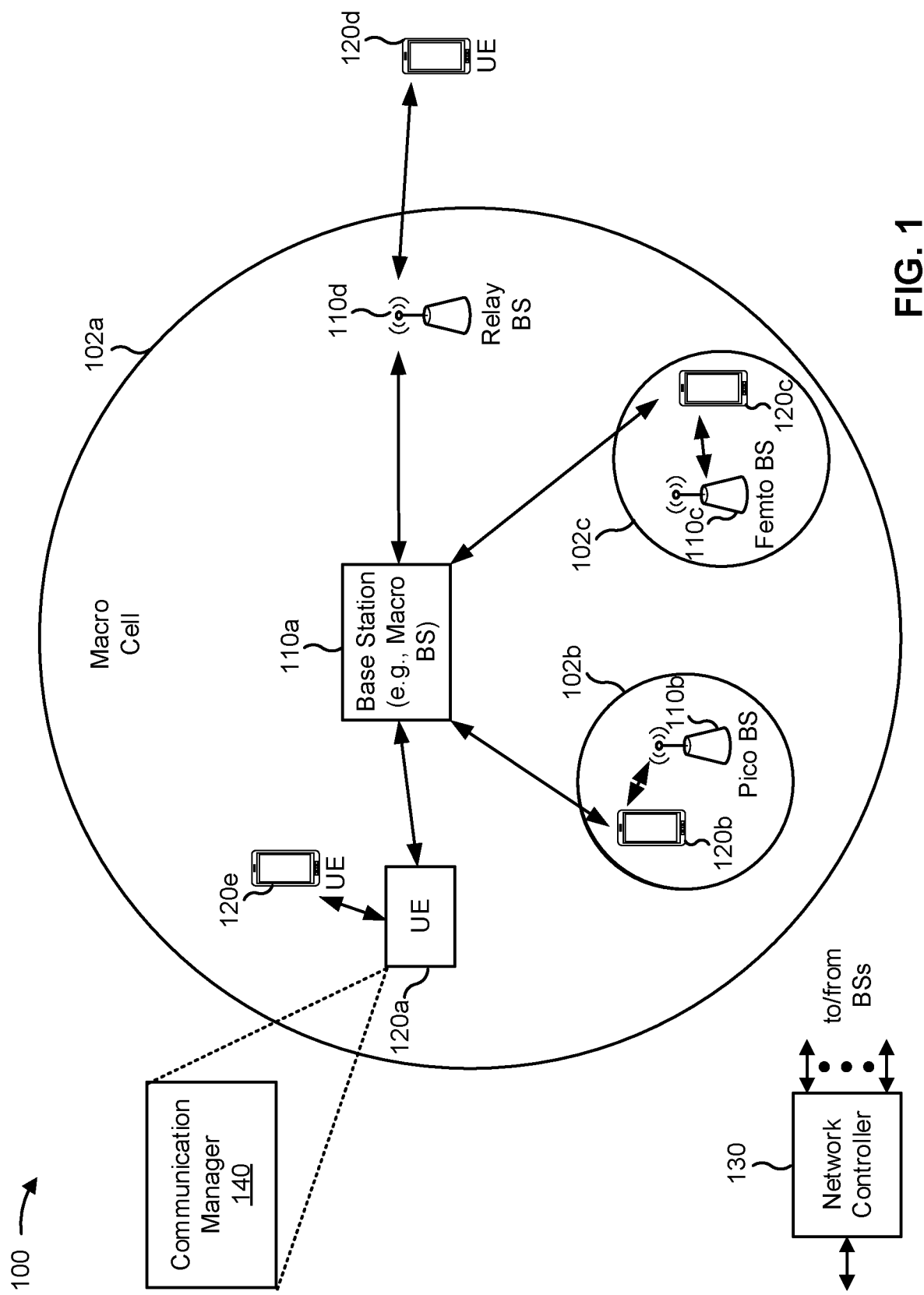
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110$a$, a BS 110$b$, a BS 110$c$, and a BS 110$d$), a user equipment (UE) 120 or multiple UEs 120 (shown as a UE 120$a$, a UE 120$b$, a UE 120$c$, a UE 120$d$, and a UE 120$e$), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110$a$ may be a macro base station for a macro cell 102$a$, the BS 110$b$ may be a pico base station for a pico cell 102$b$, and the BS 110$c$ may be a femto base station for a femto cell 102$c$. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information identifying a set of cells configured for conditional handover (CHO); identify one or more features associated with a cell; monitor one or more cells of the set of cells, wherein the one or more cells are associated with the one or more features, and wherein the one or more cells are prioritized over cells not associated with the one or more features; and initiate a handover to an identified cell based at least in part on the monitoring. Additionally, or alternatively, the communication manager 140 may perform one or more other operations described herein.

As indicated above, FIG. 1 is provided as an example. Other examples may differ from what is described with regard to FIG. 1.

Figure 2:
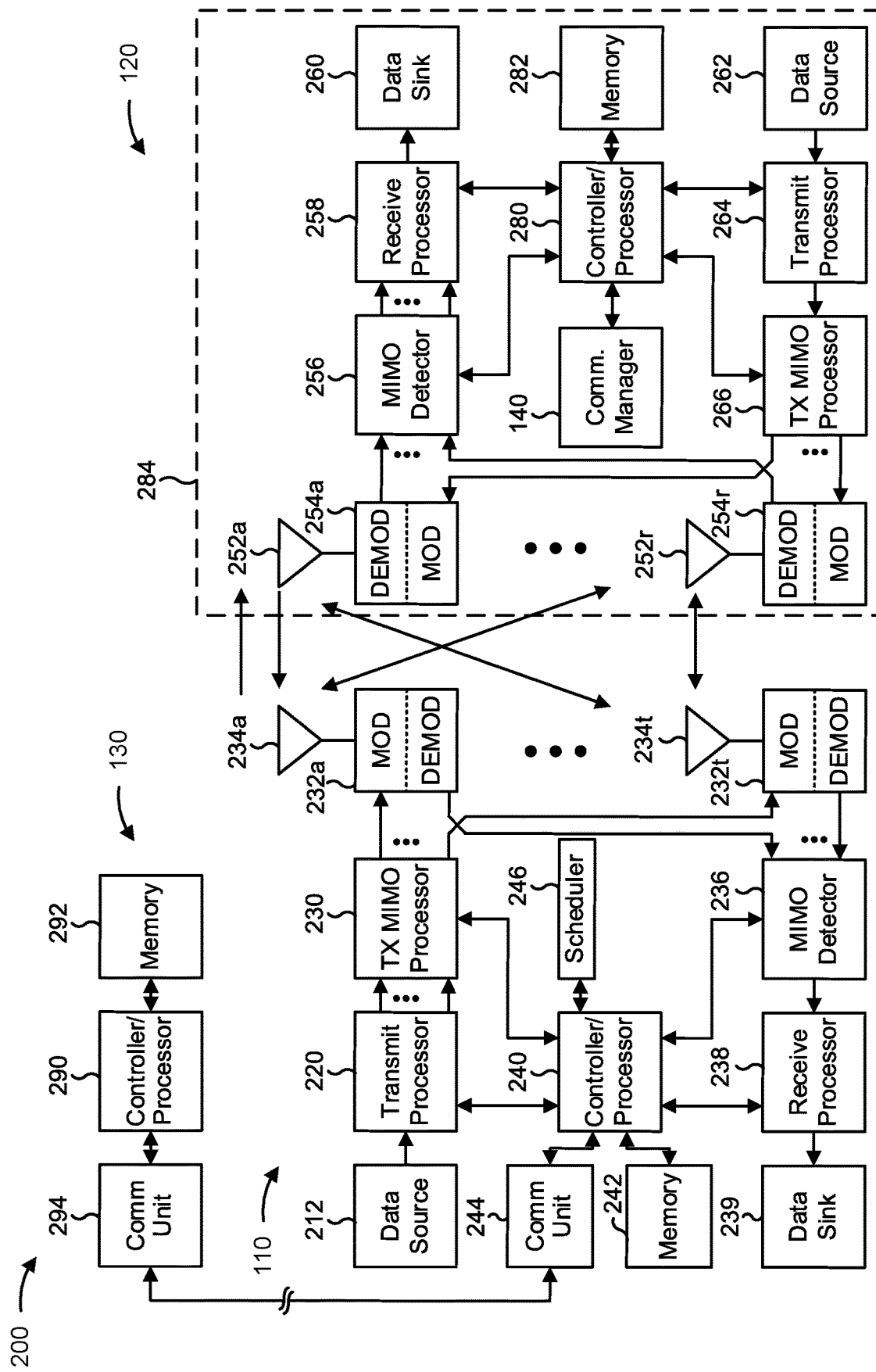
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with conditional handover, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving configuration information identifying a set of cells configured for conditional handover (CHO); means for identifying one or more features associated with a cell; means for monitoring one or more cells of the set of cells, wherein the one or more cells are associated with the one or more features, and wherein the one or more cells are prioritized over cells not associated with the one or more features; and/or means for initiating a handover to an identified cell based at least in part on the monitoring. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE and a base station may perform a handover (sometimes abbreviated HO) to switch a primary serving cell of the UE from a source cell to a target cell. Handover can be triggered by a UE (such as by transmitting a measurement report identifying a suitable target cell) or a base station (such as based at least in part on a load condition at the source cell and/or the target cell). Handover generally involves some amount of delay due to the signaling involved, such as the UE transmitting a measurement report, the base station determining whether to proceed with a handover based at least in part on the measurement report, and the signaling associated with handing the UE over to the target cell.

Conditional handover (CHO) provides a way for a UE to perform a handover autonomously (e.g., without network signaling) after CHO is configured. For example, a base station may configure a set of cells. The configured set of cells may be associated with respective trigger conditions (such as a reference signal received power (RSRP) or reference signal received quality (RSRQ) threshold, a triggering quantity, a time to trigger, or the like). The UE may store this configuration, and may monitor the set of configured cells. Once a trigger condition for one of the cells is satisfied, the UE may perform a handover without transmitting a measurement report to the network. Thus, robustness of handover is improved and latency is reduced. In some aspects, the set of cells may include up to 8 cells. The UE may use network-configured measurement gaps to measure the configured set of cells in an order which may be determined by the UE. The UE may select a cell based at least in part on these measurements. The UE may start a time to trigger (TTT) timer for the identified cell, and may thereafter perform the handover.

A UE may support various features. A feature may include, for example, multi radio access technology (RAT) dual connectivity (MR-DC) such as Evolved Universal Mobile Telecommunications System (UMTS) Terrestrial Radio Access Network (E-UTRAN) New Radio DC (EN-DC), a closed subscriber group (CSG) feature, a cellular vehicle to anything (CV2X) feature, an enhanced multimedia broadcast multicast service (eMBMS) feature, a high-bandwidth cell feature, a high speed transit (HST) feature, or the like. A UE utilizing a feature may need to be connected to a cell (e.g., have a serving cell) that supports the feature, or usage of the feature will be interrupted. However, there are situations where a UE may switch to a cell that does not support a particular feature. For example, a UE may select a cell for a CHO from a configured set of cells. The selected cell may or may not support a feature in use by the UE. In this case, if the UE selects a cell that does not support the feature, then the UE's usage of the feature may fail, thereby causing degraded throughput, interruption to services of the UE, and degraded user experience.

In some circumstances, the UE may experience radio link failure (RLF). A UE may experience RLF if a handover fails or if a handover is not initiated when required. The UE may identify RLF based at least in part on a set of block error rate (BLER) targets referred to as Qin (which corresponds to a state in which the link with the serving cell is considered reliable) and Qout (which corresponds to a state in which the link with the serving cell is considered unreliable). A UE may determine that a BLER of a serving cell satisfies a condition associated with Qout (such that the serving cell of the UE is considered unreliable), and may declare RLF if the BLER of the serving cell fails to satisfy a condition associated with Qin (such that the serving cell is once more considered reliable). Upon declaring RLF, the UE may enter an idle mode, or may attempt to establish a radio resource control (RRC) connection with a target cell (which may be the same as or different than the serving cell that experienced RLF). For example, the UE may perform cell selection to recover from RLF, and may perform an RRC connection reestablishment procedure. For example, as part of cell selection for RLF recovery, the UE may scan a last camped cell and cells from the UE's acquisition database (ACQ DB). If none of the cells in the ACQ DB are suitable for cell selection, the UE may perform a full scan and the RLF recovery may be delayed. Furthermore, if the UE identifies a target cell that is not associated with a feature in use by the UE, then usage of the feature may fail, or performance may be sub-optimal.

Some techniques and apparatuses described herein provide for a UE to prioritize, for CHO, cells associated with one or more features. For example, the UE may prioritize monitoring of cells associated with one or more features that the UE is using or desires to use. In some aspects, the UE may rank cells of the CHO configuration based at least in part on whether the cells are associated with features and/or which features are associated with the cells. Thus, the UE may prioritize measurement on cells supporting features desired by the UE, which improves throughput, reduces interruption to services of the UE, and improves user experience.

Some techniques and apparatuses described herein provide for RLF recovery based at least in part on a CHO configuration. For example, after declaring RLF, the UE may prioritize cells of a CHO configuration that are associated with a threshold measurement value (e.g., a threshold signal strength) so that these cells are monitored prior to monitoring cells from the UE's ACQ DB. Thus, the UE may increase the likelihood that a suitable cell for RLF recovery is identified, since the cells identified by the CHO configuration are likely to be available in the vicinity of the UE. Furthermore, in some aspects, the UE may prioritize cells that are associated with a feature supported or desired by the UE, thereby improving the likelihood that a UE using a particular feature is able to recover from RLF on a cell that supports the particular feature. Thus, throughput may be improved, interruption to services of the UE may be reduced, and user experience may be improved.

Figure 3:
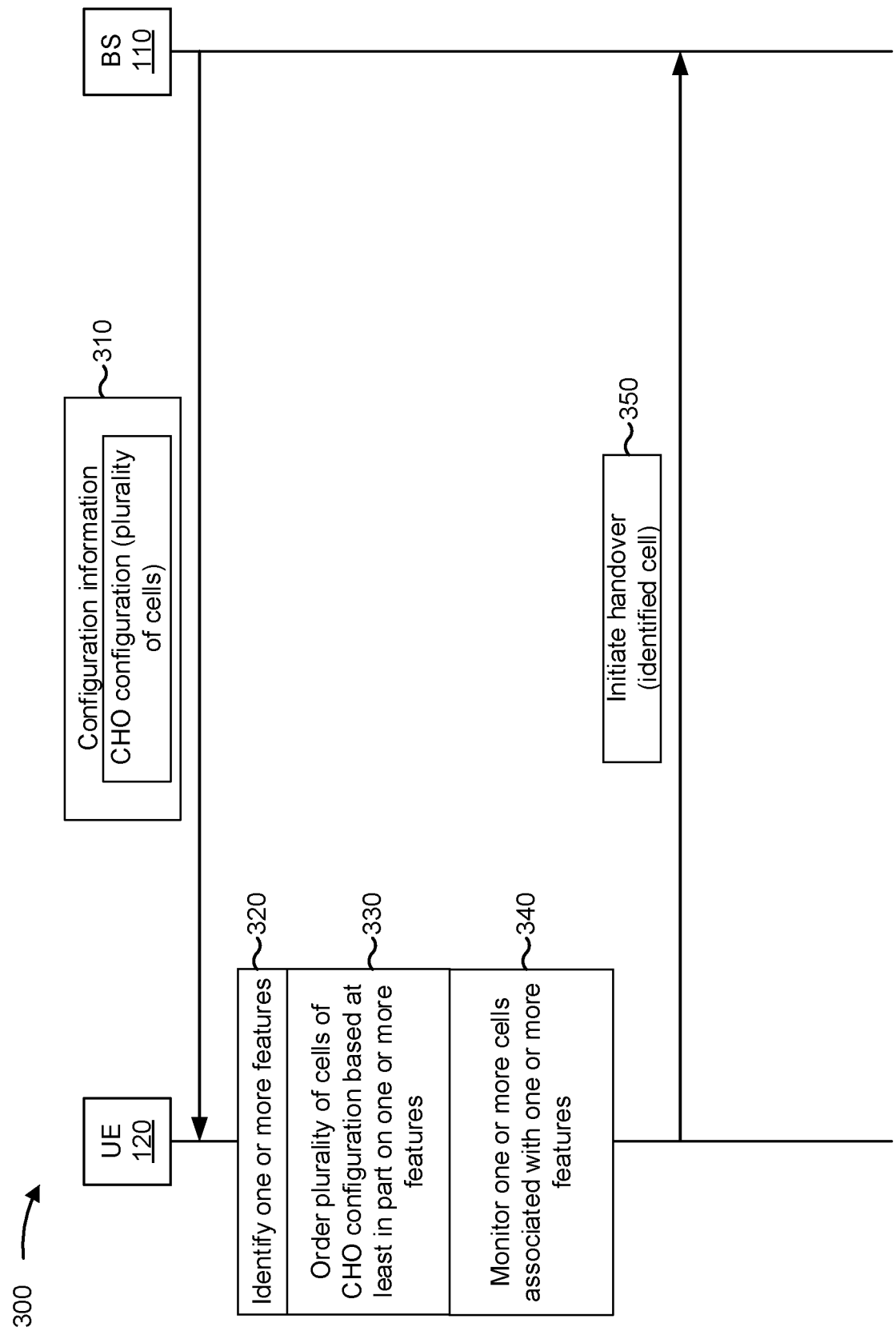
FIG. 3 is a diagram illustrating an example of selecting a cell for conditional handover (CHO) based at least in part on a feature, in accordance with the present disclosure.

FIG. 3 is a diagram illustrating an example 300 of selecting a cell for CHO based at least in part on a feature, in accordance with the present disclosure. As shown, example 300 includes a UE 120 and a BS 110.

As shown in FIG. 3, and by reference number 310, the BS 110 may transmit, and the UE 120 may receive, configuration information. As shown, the configuration information may include a CHO configuration. A CHO configuration may identify a set of cells (in example 300, a plurality of cells). The CHO configuration may further identify a triggering condition. A UE 120 performing a CHO may identify a cell from the plurality of cells for a CHO if a triggering condition associated with the cell is satisfied. For example, the UE 120 may start a TTT timer for the identified cell, and may perform a CHO to the identified cell once the TTT elapses.

As shown by reference number 320, the UE 120 may identify one or more features. In some aspects, the UE 120 may identify the one or more features to be prioritized for CHO selection. For example, the UE 120 may identify one or more features in use by the UE 120, one or more features supported by the UE 120, one or more features that the UE 120 is capable of using, or the like. In some aspects, the UE 120 may identify one or more cells associated with the one or more features. For example, the UE 120 may receive information indicating that the one or more cells support the one or more features. In some aspects, the UE 120 may receive this information in the configuration information shown by reference number 310. In some other aspects, the UE 120 may receive the information from the one or more cells (such as via system information). In some other aspects, the UE 120 may be pre-configured with this information, or may have previously determined this information based at least in part on being connected to the one or more cells.

As shown by reference number 330, in some aspects, the UE 120 may order the plurality of cells of the CHO configuration based at least in part on the one or more features. For example, the UE 120 may determine an order in which cells should be monitored (e.g., search and/or measured) for CHO. The UE 120 may prioritize cells that support the one or more features over cells that do not support the one or more features. If a cell, of the plurality of cells, does not support any feature of the one or more features, then the UE 120 may rank the cell according to an order indicated by the configuration information.

In some aspects, the UE 120 may order the plurality of cells based at least in part on stored information. For example, the UE 120 may store (e.g., maintain) information indicating a set of cells and corresponding features (e.g., HST, EN-DC, CSG, etc.). In some aspects, the UE 120 may store (e.g., maintain) a list of features (e.g., cell types) that the UE 120 prioritizes. In some aspects, the UE 120 may maintain a preferred cell database that tracks cells and supported features of cells. The list of features may be in an order, such that a first feature of the list of features is prioritized over a second feature of the list of features. In some aspects, the order may be based at least in part on a carrier configuration, an original equipment manufacturer (OEM) configuration, or a user preference. The UE may identify the features based at least in part on system information, known deployment information, or the like. In some aspects, the UE 120 may store (e.g., maintain) a list of cells associated with a feature of the list of features. For example, for a particular cell, the list of cells may identify a cell global identity (CGI), a channel number (e.g., an E-UTRA Absolute Radio Frequency Channel Number (EARFCN), a physical cell identity (PCI), and/or information indicating which features, of the list of features, are supported by the particular cell. In some aspects, the information indicating which features, of the list of features, are supported by the particular cell may include a mask that indicates whether the particular cell supports each feature of the list of features.

As shown by reference number 340, the UE 120 may monitor one or more cells associated with the one or more features. For example, the UE 120 may perform a search or measurement operation on one or more cells that are prioritized according to the stored information. In some aspects, the UE 120 may prioritize each cell associated with any of the one or more features over any cell not associated with one of the one or more features. If no cell associated with any of the one or more features is suitable for CHO, then the UE 120 may monitor one or more remaining cells of the plurality of cells of the CHO configuration. Thus, the UE 120 may increase the likelihood that an identified cell for a CHO supports a feature of the one or more features. In some aspects, the UE 120 may select multiple cells, and may start TTT timers for each of the multiple cells. The UE 120 may perform CHO for a cell whose TTT timer expires earliest. If multiple cells are associated with TTT timers that expire at the same time, then the UE 120 may select a cell that is ranked higher in the order for the CHO.

As an example, consider five cells: Cell a1 with a trigger condition configuration a, Cell b1 with a trigger condition configuration b, Cell c1 with a trigger condition configuration c, Cell d1 with a trigger condition configuration d, and Cell e1 with a trigger condition configuration e. Consider that Cell c1 is associated with a higher-priority feature (e.g., HST) and that Cell d1 is associated with a lower-priority feature (e.g., EN-DC). In this example, the UE 120 may prioritize cell search and measurement based at least in part on an ordering of the cells in which Cell c1 has a highest rank, then Cell d1 has a second-highest rank, and Cells a1, b1 and e1 have a same rank as in the CHO configuration. Furthermore, if a trigger condition is satisfied for both Cell c1 and Cell a1, and a TTT timer is running for both of these cells and expires at the same time, the UE 120 may prioritize Cell c1 for handover since Cell C1 is associated with a higher position in the order than Cell a1. In this way, the UE 120 can prioritize cells associated with preferred services so that Connected mode mobility/HO based at least in part on a CHO configuration tends to be to a cell that supports a preferred service.

As shown by reference number 350, the UE 120 may initiate a handover to an identified cell. For example, the UE 120 may identify a cell based at least in part on monitoring the one or more cells associated with the one or more features. The UE 120 may perform a CHO to the identified cell. In some aspects, the UE 120 may transmit, to the BS 110, information indicating the CHO. For example, the UE 120 may transmit an indication that the CHO is to be performed, such that the BS 110 can configure the CHO at the network.

As indicated above, FIG. 3 is provided as an example. Other examples may differ from what is described with regard to FIG. 3. For example, while FIG. 3 is primarily described in the context of CHO, the techniques of FIG. 3 can also be applied for change of primary secondary cell (CPC) operations.

Figure 4:
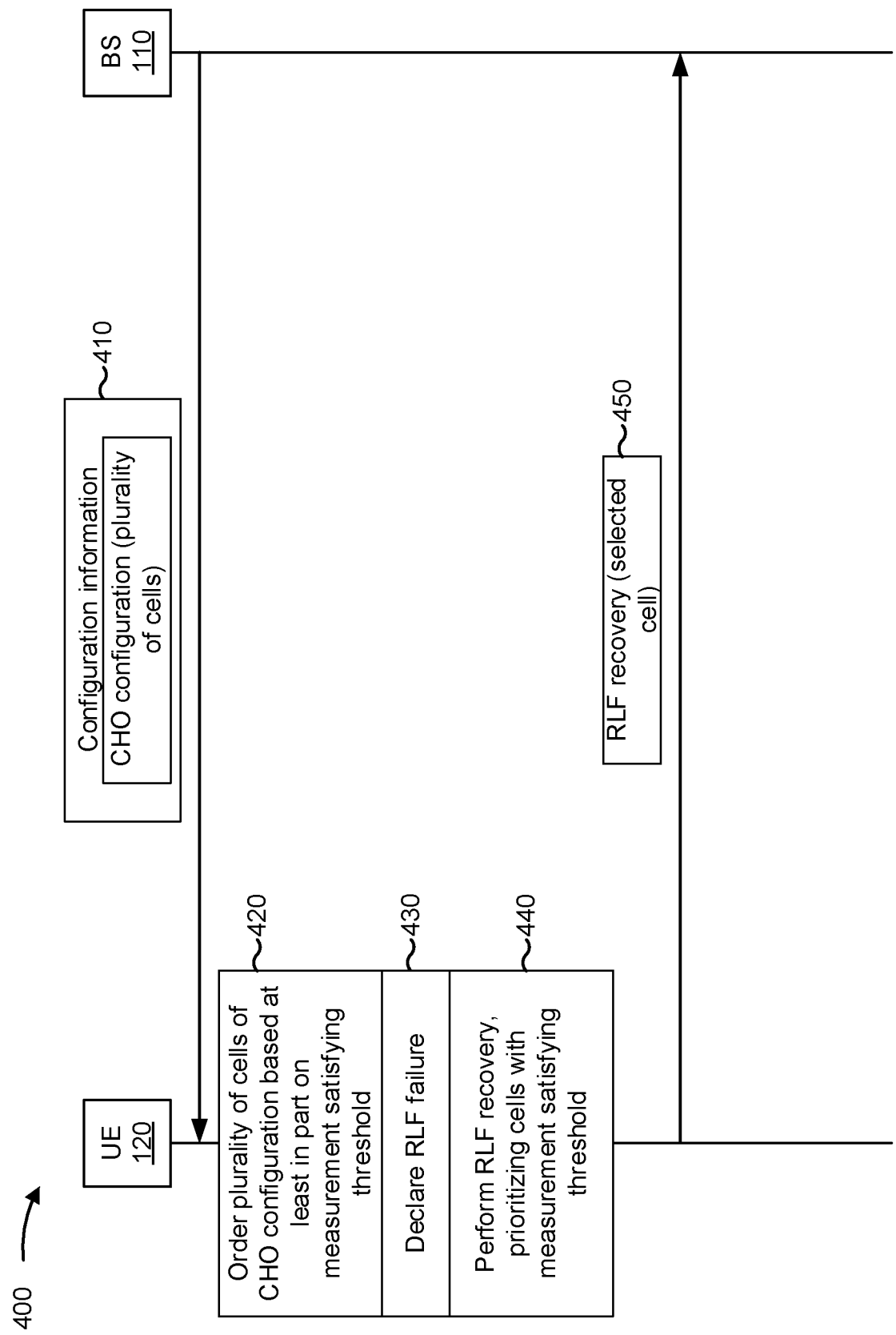
FIG. 4 is a diagram illustrating an example of performing radio link failure (RLF) recovery based at least in part on a CHO configuration, in accordance with the present disclosure.

FIG. 4 is a diagram illustrating an example 400 of performing RLF recovery based at least in part on a CHO configuration, in accordance with the present disclosure. As shown, example 400 includes a UE 120 and a BS 110.

As shown in FIG. 4, and by reference number 410, the BS 110 may transmit, and the UE 120 may receive, configuration information. The configuration information is described in more detail in connection with reference number 310 of FIG. 3.

As shown by reference number 420, the UE 120 may order the plurality of cells identified by the CHO configuration. For example, the UE 120 may order (e.g., rank) the plurality of cells of the CHO configuration based at least in part on measurements associated with the plurality of cells. In some aspects, the UE 120 may determine measurements associated with the plurality of cells. The measurements may include, for example, a signal strength measurement, such as an RSRP measurement, an RSRQ measurement, or the like. The UE 120 may order the plurality of cells according to their measurements. For example, the UE 120 may assign a cell with a highest measurement (e.g., a strongest signal strength) to a first position in the order, a cell with a second-highest measurement to a second position in the order, and so on. As another example, the UE 120 may assign all cells with measurements that satisfy a threshold to a higher position in the order, and may assign all cells with measurements that fail to satisfy the threshold to a lower position in the order. The threshold may be predefined for the UE 120, determined by the UE 120, or the like.

As an example, consider a set of cells Cell_x1, Cell_y1, and Cell_z1. The UE 120 may measure the set of cells such that Cell_x1 has an rsrp_x (such that rsrp_x>=threshold), cell_y1 has an rsrp_y (such that rsrp_y>=threshold AND rsrp_x), and cell_z1 has an rsrp_z (such that rsrp_z<threshold). In this case, the UE 120 may assign an order of Cell_y1, Cell_x1, Cell_z1. Thus, the UE 120 may prioritize RLF recovery on Cell_y1, followed by Cell_x1, before proceeding to perform RLF recovery using an ACQ DB for RLF recovery. In some aspects, the UE 120 may not prioritize Cell_z1 since the measurement rsrp_z does not satisfy the threshold.

As shown by reference number 430, the UE 120 may declare RLF. For example, the UE 120 may determine that a timer has expired after a consecutive number of out-of-sync indications without receiving an in-sync indication, may determine that a random access failure has occurred, may determine that a maximum number of radio link control retransmissions has been reached, or the like. Accordingly, as shown by reference number 440, the UE 120 may perform RLF recovery prioritizing cells with a measurement satisfying a threshold. For example, the UE 120 may perform search or measurement using an order as determined in connection with reference number 420 (which may prioritize cells of a CHO configuration in order of signal strength of the cells, or which may prioritize cells of a CHO configuration associated with a threshold signal strength over cells not associated with a threshold signal strength). As shown by reference number 450, the UE 120 may transmit an indication of the RLF recovery identifying a selected cell. For example, the UE 120 may transmit an RRC connection reestablishment request, a physical random access channel (PRACH), or the like.

As indicated above, FIG. 4 is provided as an example. Other examples may differ from what is described with regard to FIG. 4.

Figure 5:
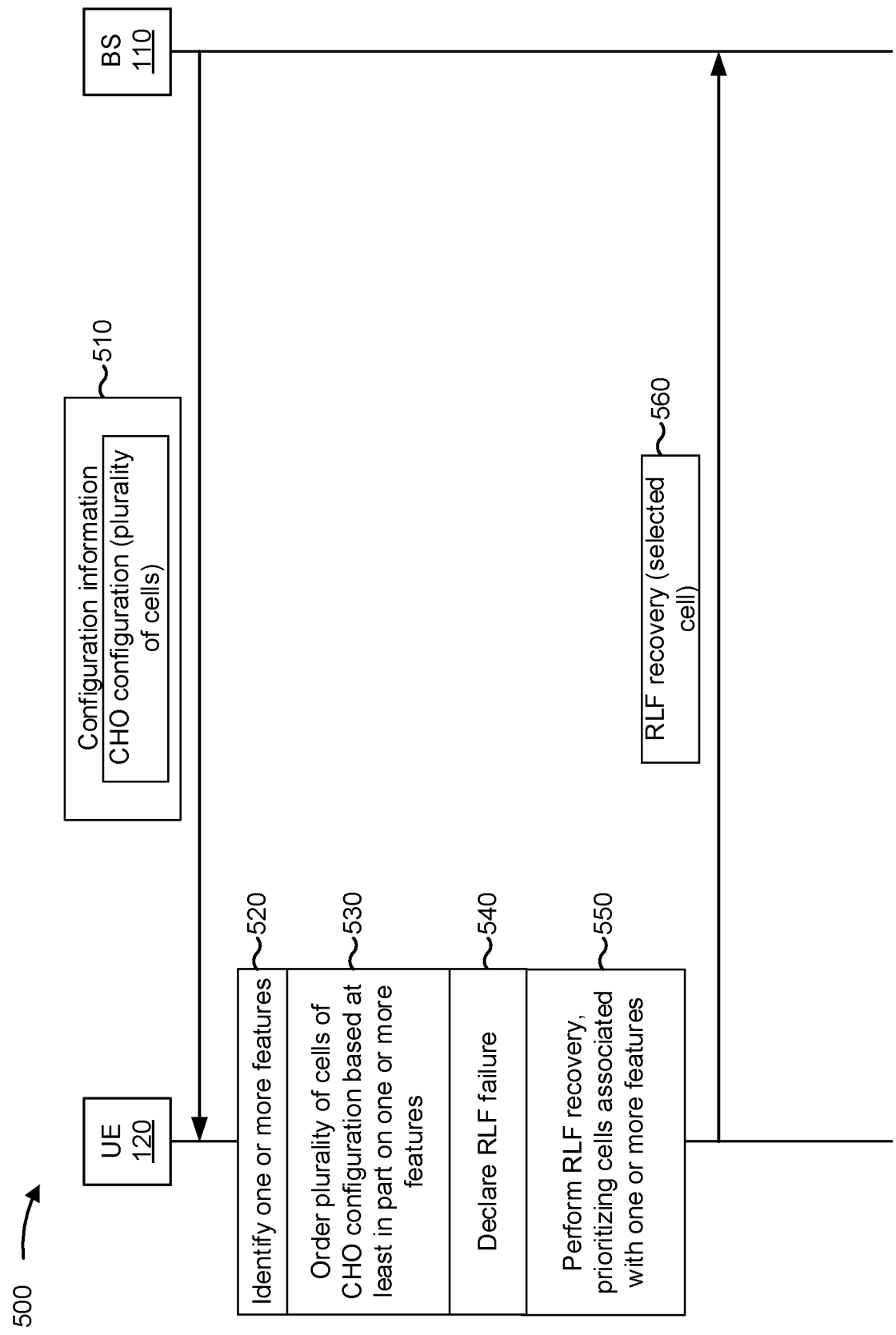
FIG. 5 is a diagram illustrating an example of performing RLF recovery based at least in part on a feature supported by a cell, in accordance with the present disclosure.

FIG. 5 is a diagram illustrating an example 500 of performing RLF recovery based at least in part on a feature supported by a cell, in accordance with the present disclosure. As shown, example 500 includes a UE 120 and a BS 110.

As shown in FIG. 5, and by reference number 510, the BS 110 may transmit, and the UE 120 may receive, configuration information. The configuration information is described in more detail in connection with reference number 310 of FIG. 3.

As shown by reference number 520, the UE 120 may identify one or more features. In some aspects, the UE 120 may identify the one or more features to be prioritized for CHO selection. For example, the UE 120 may identify one or more features in use by the UE 120, one or more features supported by the UE 120, one or more features that the UE 120 is capable of using, or the like. In some aspects, the UE 120 may identify one or more cells associated with the one or more features. For example, the UE 120 may receive information indicating that the one or more cells support the one or more features. In some aspects, the UE 120 may receive this information in the configuration information shown by reference number 510. In some other aspects, the UE 120 may receive the information from the one or more cells (such as via system information). In some other aspects, the UE 120 may be pre-configured with this information, or may have previously determined this information based at least in part on being connected to the one or more cells.

As shown by reference number 530, the UE 120 may order the plurality of cells identified by the CHO configuration. In some aspects, the UE 120 may order the plurality of cells based at least in part on whether measurements associated with the plurality of cells satisfy a threshold. For example, the UE 120 may determine a first group of cells associated with a measurement that satisfies a threshold, and a second group of cells associated with a measurement that does not satisfy a threshold. Additionally, the UE 120 may order the plurality of cells based at least in part on the one or more features. For example, of the first group of cells, the UE 120 may prioritize cells associated with a feature of the one or more features over cells not associated with any feature of the one or more features. As another example, the UE 120 may prioritize a cell associated with a first feature that is higher priority over a cell associated with a second feature that is lower priority. Thus, the UE 120 may prioritize cells associated with a measurement that satisfies a threshold, and may further prioritize among cells associated with a measurement that satisfies a threshold based at least in part on whether the cells are associated with a feature preferred by the UE 120.

As an example, consider a set of cells Cell_x1, Cell_y1, and Cell_z1. The UE 120 may measure the set of cells such that Cell_x1 has an rsrp_x (such that rsrp_x<threshold), Cell_y1 has an rsrp_y (such that rsrp_y>=threshold AND rsrp_x AND rsrp_z), and Cell_z1 has an rsrp_z (such that rsrp_z>=threshold AND rsrp_x). Consider further that Cell_z1 is associated with a highest priority feature, Cell_y1 is associated with a second highest priority feature, and Cell_x1 is associated with a lowest priority feature. In this case, the UE 120 may assign an order of Cell_z1, Cell_y1, Cell_x1. For example, the UE 120 may determine that Cell_z1 and Cell_y1 are associated with measurements that satisfy the threshold, and that Cell_z1 is associated with a higher priority feature than Cell_y1. Thus, the UE 120 may prioritize RLF recovery on Cell_z1, followed by Cell_y1, before proceeding to perform RLF recovery using an ACQ DB for RLF recovery. In some aspects, the UE 120 may not prioritize Cell_x1 since the measurement rsrp_x does not satisfy the threshold.

In some aspects, the UE 120 may order the plurality of cells based at least in part on stored information. For example, the UE 120 may maintain information indicating a set of cells and corresponding features (e.g., HST, ENDC, CSG, etc.). In some aspects, the UE 120 may store (e.g., maintain) a list of features (e.g., cell types) that the UE 120 prioritizes. The list of features may be in an order, such that a first feature of the list of features is prioritized over a second feature of the list of features. In some aspects, the UE 120 may store (e.g., maintain) a list of cells associated with a feature of the list of features. For example, for a particular cell, the list of cells may identify a CGI, a channel number (e.g., an EARFCN), a PCI, and/or information indicating which features, of the list of features, are supported by the particular cell. In some aspects, the information indicating which features, of the list of features, are supported by the particular cell may include a mask that indicates whether the particular cell supports each feature of the list of features.

As shown by reference number 540, the UE 120 may declare RLF, as described in more detail in connection with reference number 430 of FIG. 4. As shown by reference number 550, the UE 120 may perform RLF recovery. The UE 120 may prioritize cells associated with a feature of the one or more features over cells not associated with a feature. For example, the UE 120 may perform search and/or measurement using the order described in connection with reference number 530. Thus, during RLF recover, the UE 120 may prioritize cell selection to a cell associated with a feature of the one or more features so long as the cell is associated with a measurement that satisfies the threshold. If no cell associated with a feature of the one or more features and a measurement that satisfies the threshold can be found, then the UE 120 may select a cell associated with a measurement that satisfies the threshold and that is not associated with a feature of the one or more features. As shown by reference number 560, the UE 120 may transmit an indication of the RLF recovery identifying a selected cell, as described in more detail in connection with reference number 450 of FIG. 4.

As indicated above, FIG. 5 is provided as an example. Other examples may differ from what is described with regard to FIG. 5.

Figure 6:
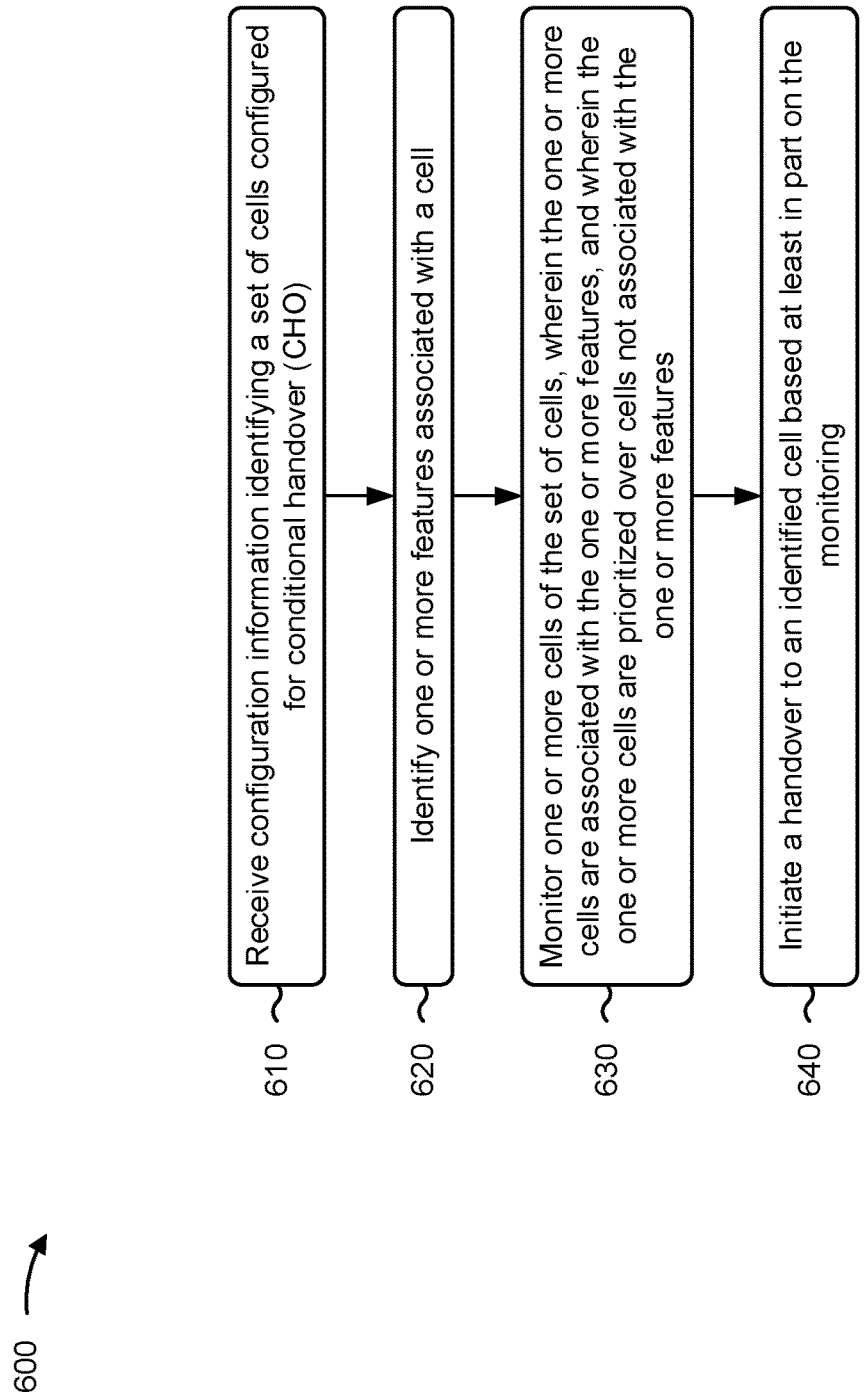
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with cell selection and service continuity for CHO.

As shown in FIG. 6, in some aspects, process 600 may include receiving configuration information identifying a set of cells configured for conditional handover (CHO) (block 610). For example, the UE (e.g., using communication manager 140 and/or reception component 702, depicted in FIG. 7) may receive configuration information identifying a set of cells configured for CHO, as described above.

As further shown in FIG. 6, in some aspects, process 600 may include identifying one or more features associated with a cell (block 620). For example, the UE (e.g., using communication manager 140 and/or identification component 708, depicted in FIG. 7) may identify one or more features associated with a cell, as described above.

As further shown in FIG. 6, in some aspects, process 600 may include monitoring one or more cells of the set of cells, wherein the one or more cells are associated with the one or more features, and wherein the one or more cells are prioritized over cells not associated with the one or more features (block 630). For example, the UE (e.g., using communication manager 140 and/or monitoring component 710, depicted in FIG. 7) may monitor one or more cells of the set of cells, wherein the one or more cells are associated with the one or more features, and wherein the one or more cells are prioritized over cells not associated with the one or more features, as described above.

As further shown in FIG. 6, in some aspects, process 600 may include initiating a handover to an identified cell based at least in part on the monitoring (block 640). For example, the UE (e.g., using communication manager 140 and/or transmission component 704, depicted in FIG. 7) may initiate a handover to an identified cell based at least in part on the monitoring, as described above.

Process 600 may include additional aspects, such as any single aspect or any combination of aspects described below and/or in connection with one or more other processes described elsewhere herein.

In a first aspect, the one or more features include a first feature and a second feature, wherein the first feature is prioritized over the second feature, and wherein a cell associated with the first feature is prioritized over a cell associated with the second feature.

In a second aspect, alone or in combination with the first aspect, each cell, of the set of cells, that is associated with the one or more features is prioritized over any cell, of the set of cells, that is not associated with any of the one or more features.

In a third aspect, alone or in combination with one or more of the first and second aspects, process 600 includes identifying, based at least in part on the monitoring, a first cell and a second cell of the set of cells, wherein the first cell is associated with the one or more features and the second cell is not associated with the one or more features, and selecting the first cell as the selected cell based at least in part on the first cell being associated with the one or more features and the second cell not being associated with the one or more features.

In a fourth aspect, alone or in combination with one or more of the first through third aspects, a time to trigger associated with the first cell expires at the same time as a time to trigger associated with the second cell.

In a fifth aspect, alone or in combination with one or more of the first through fourth aspects, the one or more features include at least one of a high-speed transit feature, a dual connectivity feature, a closed subscriber group feature, a cellular vehicle-to-anything feature, a multimedia broadcast multicast service feature, or a threshold bandwidth.

In a sixth aspect, alone or in combination with one or more of the first through fifth aspects, process 600 includes identifying a radio link failure (RLF) on the identified cell, and selecting a cell for RLF recovery, wherein the set of cells configured for CHO are prioritized for the selection of the cell for RLF recovery.

In a seventh aspect, alone or in combination with one or more of the first through sixth aspects, the selection of the cell for RLF recovery is based at least in part on a measurement satisfying a threshold, wherein cells of the set of cells configured for CHO that are associated with the measurement satisfying the threshold are prioritized for the selection of the cell for RLF recovery.

In an eighth aspect, alone or in combination with one or more of the first through seventh aspects, the selection of the cell for RLF recovery is based at least in part on the one or more features, wherein cells of the set of cells configured for CHO that are associated with the one or more features are prioritized for the selection of the cell for RLF recovery.

In a ninth aspect, alone or in combination with one or more of the first through eighth aspects, if no cell associated with the one or more features is selected, the selection of the cell for RLF recovery is based at least in part on a measurement satisfying a threshold.

In a tenth aspect, alone or in combination with one or more of the first through ninth aspects, process 600 includes determining a set of cells that are associated with the one or more features, and storing information indicating that the set of cells are associated with the one or more features, wherein the monitoring is based at least in part on the stored information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
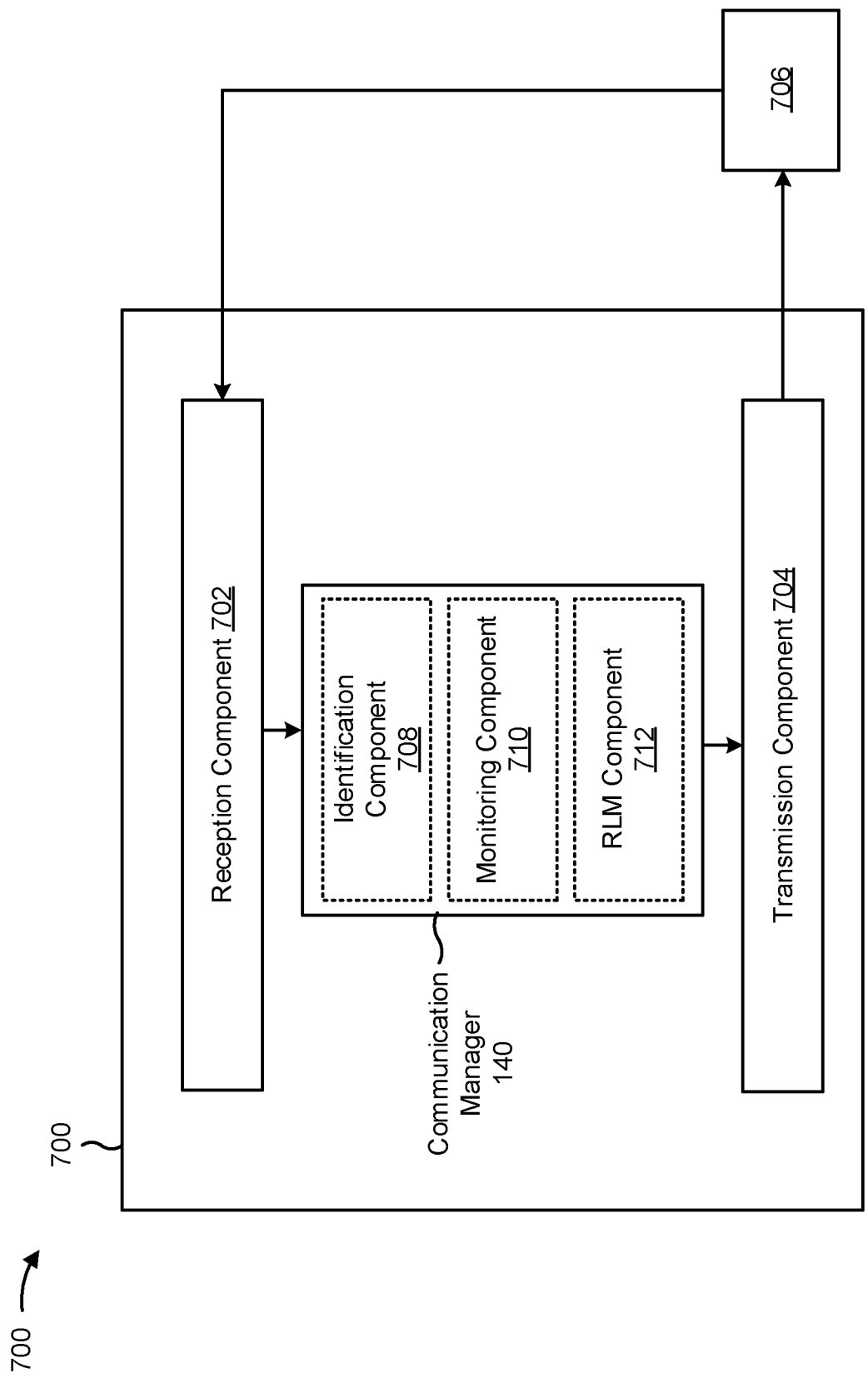
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include an identification component 708, a monitoring component 710, or an RLF component 712, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive configuration information identifying a set of cells configured for conditional handover (CHO). The identification component 708 may identify one or more features associated with a cell. The monitoring component 710 may monitor one or more cells of the set of cells, wherein the one or more cells are associated with the one or more features, and wherein the one or more cells are prioritized over cells not associated with the one or more features. The transmission component 704 may initiate a handover to an identified cell based at least in part on the monitoring.

The identification component 708 may identify, based at least in part on the monitoring, a first cell and a second cell of the set of cells, wherein the first cell is associated with the one or more features and the second cell is not associated with the one or more features.

The identification component 708 may select the first cell as the selected cell based at least in part on the first cell being associated with the one or more features and the second cell not being associated with the one or more features.

The RLF component 712 may identify a radio link failure (RLF) on the identified cell.

The identification component 708 may select a cell for RLF recovery, wherein the set of cells configured for CHO are prioritized for the selection of the cell for RLF recovery.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving configuration information identifying a set of cells configured for conditional handover (CHO); identifying one or more features associated with a cell; monitoring one or more cells of the set of cells, wherein the one or more cells are associated with the one or more features, and wherein the one or more cells are prioritized over cells not associated with the one or more features; and initiating a handover to an identified cell based at least in part on the monitoring.

Aspect 2: The method of Aspect 1, wherein the one or more features include a first feature and a second feature, wherein the first feature is prioritized over the second feature, and wherein a cell associated with the first feature is prioritized over a cell associated with the second feature.

Aspect 3: The method of any of Aspects 1-2, wherein each cell, of the set of cells, that is associated with the one or more features is prioritized over any cell, of the set of cells, that is not associated with any of the one or more features.

Aspect 4: The method of any of Aspects 1-3, further comprising: identifying, based at least in part on the monitoring, a first cell and a second cell of the set of cells, wherein the first cell is associated with the one or more features and the second cell is not associated with the one or more features; and selecting the first cell as the selected cell based at least in part on the first cell being associated with the one or more features and the second cell not being associated with the one or more features.

Aspect 5: The method of Aspect 4, wherein a time to trigger associated with the first cell expires at the same time as a time to trigger associated with the second cell.

Aspect 6: The method of any of Aspects 1-5, wherein the one or more features include at least one of: a high-speed transit feature, a dual connectivity feature, a closed subscriber group feature, a cellular vehicle-to-anything feature, a multimedia broadcast multicast service feature, or a threshold bandwidth.

Aspect 7: The method of any of Aspects 1-6, further comprising: identifying a radio link failure (RLF) on the identified cell; and selecting a cell for RLF recovery, wherein the set of cells configured for CHO are prioritized for the selection of the cell for RLF recovery.

Aspect 8: The method of Aspect 7, wherein the selection of the cell for RLF recovery is based at least in part on a measurement satisfying a threshold, wherein cells of the set of cells configured for CHO that are associated with the measurement satisfying the threshold are prioritized for the selection of the cell for RLF recovery.

Aspect 9: The method of Aspect 7, wherein the selection of the cell for RLF recovery is based at least in part on the one or more features, wherein cells of the set of cells configured for CHO that are associated with the one or more features are prioritized for the selection of the cell for RLF recovery.

Aspect 10: The method of Aspect 9, wherein, if no cell associated with the one or more features is selected, the selection of the cell for RLF recovery is based at least in part on a measurement satisfying a threshold.

Aspect 11: The method of any of Aspects 1-10, further comprising: determining a set of cells that are associated with the one or more features; and storing information indicating that the set of cells are associated with the one or more features, wherein the monitoring is based at least in part on the stored information.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving configuration information identifying a set of cells configured for conditional handover (CHO);
   identifying whether each cell supports each of a set of features, the set of features comprising:
      a high-speed transit feature,
      a dual connectivity feature,
      a closed subscriber group feature,
      a cellular vehicle-to-anything feature,
      a multimedia broadcast multicast service feature, and
      a threshold bandwidth;
   ranking the set of cells indicated in the configuration information in a prioritized order based at least in part on the identifying the set of features associated with the one or more cells of the set of cells, wherein the ranking is based at least in part on a priority order of the set of features;
   monitoring, in the prioritized order, the one or more cells of the set of cells, based at least in part on whether the one or more cells support each of the set of features, and wherein the monitoring of the one or more cells comprises first searching for a first prioritized cell of the one or more cells; and
   initiating a handover to an identified cell of the monitored one or more cells based at least in part on the monitoring.

2. The method of claim 1, wherein a cell that supports a first feature of the set of features is prioritized over a cell that supports a second feature of the set of features.

3. The method of claim 1, wherein each cell, of the set of cells, that is associated with the set of features is prioritized over any cell, of the set of cells, that is not associated with any of the set of features.

4. The method of claim 1, further comprising:
   identifying, based at least in part on the monitoring, a first cell and a second cell of the set of cells, wherein the first cell is associated with the set of features and the second cell is not associated with the set of features; and
   selecting the first cell as the identified cell based at least in part on the first cell being associated with the set of features and the second cell not being associated with the set of features.

5. The method of claim 4, wherein a time to trigger associated with the first cell expires at the same time as a time to trigger associated with the second cell.

6. The method of claim 1, further comprising:
   identifying a radio link failure (RLF) on the identified cell; and
   selecting a cell for RLF recovery, wherein the set of cells configured for CHO are prioritized for the selection of the cell for RLF recovery.

7. The method of claim 6, wherein the selection of the cell for RLF recovery is based at least in part on a measurement satisfying a threshold, wherein cells of the set of cells configured for CHO that are associated with the measurement satisfying the threshold are prioritized for the selection of the cell for RLF recovery.

8. The method of claim 6, wherein the selection of the cell for RLF recovery is based at least in part on the set of features, wherein cells of the set of cells configured for CHO that are associated with the set of features are prioritized for the selection of the cell for RLF recovery.

9. The method of claim 8, wherein, if no cell associated with the set of features is selected, the selection of the cell for RLF recovery is based at least in part on a measurement satisfying a threshold.

10. The method of claim 1, further comprising:
determining a set of cells that are associated with the set of features; and
storing information indicating that the set of cells are associated with the set of features, wherein the monitoring is based at least in part on the stored information.

11. The method of claim 1, wherein the monitoring further comprises:
performing measurements of the one or more cells in the prioritized order.

12. A user equipment (UE) for wireless communication, comprising:
a memory; and
one or more processors, coupled to the memory, configured to:
receive configuration information identifying a set of cells configured for conditional handover (CHO);
identify whether each cell supports each of a set of features, the set of features comprising:
a high-speed transit feature,
a dual connectivity feature,
a closed subscriber group feature,
a cellular vehicle-to-anything feature,
a multimedia broadcast multicast service feature, and
a threshold bandwidth;
rank the set of cells indicated in the configuration information in a prioritized order based at least in part on the identifying the set of features associated with the one or more cells of the set of cells, wherein the ranking is based at least in part on a priority order of the set of features;
monitor, in the prioritized order, the one or more cells of the set of cells, based at least in part on whether the one or more cells support each of the set of features, and wherein the monitoring of the one or more cells comprises first searching for a first prioritized cell of the one or more cells; and
initiate a handover to an identified cell of the monitored one or more cells based at least in part on the monitoring.

13. The UE of claim 12, wherein a cell associated with a first feature of the set of features is prioritized over a cell associated with a second feature of the set of features.

14. The UE of claim 12, wherein each cell, of the set of cells, that is associated with the set of features is prioritized over any cell, of the set of cells, that is not associated with any of the set of features.

15. The UE of claim 12, wherein the one or more processors are further configured to:
identify, based at least in part on the monitoring, a first cell and a second cell of the set of cells, wherein the first cell is associated with the set of features and the second cell is not associated with the set of features; and
select the first cell as the identified cell based at least in part on the first cell being associated with the set of features and the second cell not being associated with the set of features.

16. The UE of claim 15, wherein a time to trigger associated with the first cell expires at the same time as a time to trigger associated with the second cell.

17. The UE of claim 12, wherein the one or more processors are further configured to:
identify a radio link failure (RLF) on the identified cell; and
select a cell for RLF recovery, wherein the set of cells configured for CHO are prioritized for the selection of the cell for RLF recovery.

18. The UE of claim 12, wherein the one or more processors, configured to monitor, are further configured to:
perform measurements of the one or more cells in the prioritized order.

19. A non-transitory computer-readable medium storing a set of instructions for wireless communication, the set of instructions comprising:
one or more instructions that, when executed by one or more processors of a user equipment (UE), cause the UE to:
receive configuration information identifying a set of cells configured for conditional handover (CHO);
identify whether each cell supports each of a set of features, the set of features comprising:
a high-speed transit feature,
a dual connectivity feature,
a closed subscriber group feature,
a cellular vehicle-to-anything feature,
a multimedia broadcast multicast service feature, and
a threshold bandwidth;
rank the set of cells indicated in the configuration information in a prioritized order based at least in part on the identifying the set of features associated with the one or more cells of the set of cells, wherein the ranking is based at least in part on a priority order of the set of features;
monitor, in the prioritized order, the one or more cells of the set of cells, based at least in part on whether the one or more cells support each of the set of features, and wherein the monitoring of the one or more cells comprises first searching for a first prioritized cell of the one or more cells; and
initiate a handover to an identified cell of the monitored one or more cells based at least in part on the monitoring.

20. The non-transitory computer-readable medium of claim 19, wherein the set of features include a first feature and a second feature, wherein the first feature is prioritized over the second feature, and wherein a cell associated with the first feature is prioritized over a cell associated with the second feature.

21. The non-transitory computer-readable medium of claim 19, wherein each cell, of the set of cells, that is associated with the set of features is prioritized over any cell, of the set of cells, that is not associated with any of the set of features.

22. The non-transitory computer-readable medium of claim 19, wherein the one or more instructions further cause the UE to:
identify, based at least in part on the monitoring, a first cell and a second cell of the set of cells, wherein the first cell is associated with the set of features and the second cell is not associated with the set of features; and
select the first cell as the identified cell based at least in part on the first cell being associated with the set of features and the second cell not being associated with the set of features.

23. The non-transitory computer-readable medium of claim 22, wherein a time to trigger associated with the first cell expires at the same time as a time to trigger associated with the second cell.

24. The non-transitory computer-readable medium of claim 19, wherein the one or more instructions further cause the UE to:
   identify a radio link failure (RLF) on the identified cell; and
   select a cell for RLF recovery, wherein the set of cells configured for CHO are prioritized for the selection of the cell for RLF recovery.

25. The non-transitory computer-readable medium of claim 19, wherein the one or more instructions further cause the UE to:
   determine a set of cells that are associated with the set of features; and
   store information indicating that the set of cells are associated with the set of features, wherein the monitoring is based at least in part on the stored information.

26. The non-transitory computer-readable medium of claim 19, wherein the one or more instructions, to cause the UE to monitor, further cause the UE to:
   perform measurements of the one or more cells in the prioritized order.

27. An apparatus for wireless communication, comprising:
   means for receiving configuration information identifying a set of cells configured for conditional handover (CHO);
   means for identifying whether each cell supports each of a set of features, the set of features comprising:
   a high-speed transit feature,
   a dual connectivity feature,
   a closed subscriber group feature,
   a cellular vehicle-to-anything feature,
   a multimedia broadcast multicast service feature, and
   a threshold bandwidth;
   means for ranking the set of cells indicated in the configuration information in a prioritized order based at least in part on the identifying the set of features associated with the one or more cells of the set of cells, wherein the ranking is based at least in part on a priority order of the set of features;
   means for monitoring, in the prioritized order, the one or more cells of the set of cells, based at least in part on whether the one or more cells support each of the set of features, and wherein the monitoring of the one or more cells comprises first searching for a first prioritized cell of the one or more cells; and
   means for initiating a handover to an identified cell of the monitored one or more cells based at least in part on the monitoring.

28. The apparatus of claim 27, wherein a cell associated with a first feature is prioritized over a cell associated with a second feature of the set of features.

29. The apparatus of claim 27, wherein each cell, of the set of cells, that is associated with the set of features is prioritized over any cell, of the set of cells, that is not associated with any of the set of features.

30. The apparatus of claim 27, further comprising:
   means for identifying a radio link failure (RLF) on the identified cell; and
   means for selecting a cell for RLF recovery, wherein the set of cells configured for CHO are prioritized for the selection of the cell for RLF recovery.

* * * * *